United States Patent
Kinoshita et al.

(10) Patent No.: US 8,638,313 B2
(45) Date of Patent: Jan. 28, 2014

(54) ELECTROSTATIC CAPACITANCE TYPE TOUCH PANEL AND SCREEN INPUT DISPLAY DEVICE INCLUDING THE SAME

(75) Inventors: Masayoshi Kinoshita, Oita (JP); Norio Mamba, Kawasaki (JP); Mutsuko Hatano, Kokubunji (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1079 days.

(21) Appl. No.: 12/423,858

(22) Filed: Apr. 15, 2009

(65) Prior Publication Data

US 2009/0262095 A1 Oct. 22, 2009

(30) Foreign Application Priority Data

Apr. 16, 2008 (JP) .................................. 2008-106350

(51) Int. Cl.
*G06F 3/044* (2006.01)
(52) U.S. Cl.
USPC .......................................................... 345/174
(58) Field of Classification Search
USPC ...................... 345/174, 173; 341/34; 349/149
See application file for complete search history.

(56) References Cited

U.S. PATENT DOCUMENTS

| 5,473,195 | A | * | 12/1995 | Koike | 257/775 |
| 5,650,597 | A | * | 7/1997 | Redmayne | 178/18.06 |
| 5,844,506 | A | | 12/1998 | Binstead | |
| 6,549,193 | B1 | * | 4/2003 | Huang et al. | 345/173 |
| 7,030,860 | B1 | * | 4/2006 | Hsu et al. | 345/173 |
| 8,040,321 | B2 | * | 10/2011 | Peng et al. | 345/169 |
| 2004/0174356 | A1 | * | 9/2004 | Ide et al. | 345/209 |
| 2009/0002338 | A1 | * | 1/2009 | Kinoshita et al. | 345/174 |
| 2009/0244021 | A1 | | 10/2009 | Matsuo et al. | |

FOREIGN PATENT DOCUMENTS

JP 2009-237673 10/2009

\* cited by examiner

*Primary Examiner* — Alexander S Beck
*Assistant Examiner* — James M Holland
(74) *Attorney, Agent, or Firm* — Antonelli, Terry, Stout & Kraus, LLP.

(57) ABSTRACT

An electrostatic capacitance type touch panel includes: a substrate; a plurality of first electrodes disposed in parallel on the substrate; an insulating film formed so as to cover the plurality of first electrodes; a plurality of second electrodes disposed in parallel to intersect the plurality of first electrodes on the insulating film; a plurality of first drawing wiring lines connected to the plurality of first electrodes to be drawn to a connection terminal; and a plurality of second drawing wiring lines connected to the plurality of second electrodes to be drawn to the connection terminal. The plurality of first drawing wiring lines have different lengths, larger widths as the lengths are shorter, and larger intervals between adjacent two of the plurality of first drawing wiring lines as the lengths are longer.

20 Claims, 15 Drawing Sheets

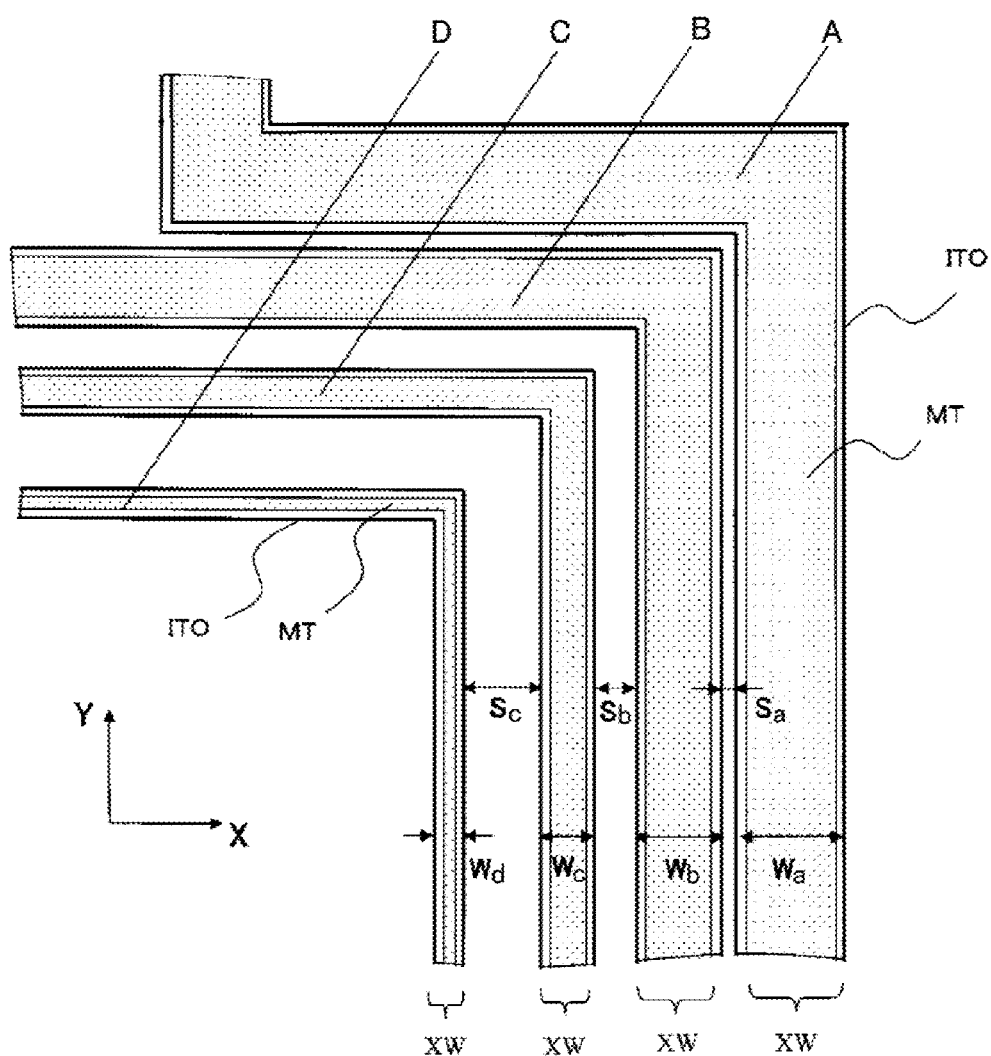

ELECTROSTATIC CAPACITANCE TYPE TOUCH PANEL AND SCREEN INPUT DISPLAY DEVICE INCLUDING THE SAME

CROSS-REFERENCE TO RELATED APPLICATION

The present application claims priority from Japanese application JP 2008-106350 filed on Apr. 16, 2008, the content of which is hereby incorporated by reference into this application.

BACKGROUND OF THE INVENTION

1. Field of the Invention

The present invention relates to an electrostatic capacitance type touch panel and a screen input display device including the same.

2. Description of the Related Art

The electrostatic capacitance type touch panel stacked in a display area of the screen input display device includes X electrodes disposed in parallel in a Y direction to extend in an X direction and Y electrodes disposed in parallel in the X direction to extend in the Y direction which are formed on a substrate via an insulating film.

When touching the electrostatic capacitance type touch panel by a finger, based on a capacity change of an electrode of this portion, for example, an external circuit calculates X and Y coordinates of a contact point of the finger to reflect information thereof in the display device.

U.S. Pat. No. 5,844,506 discloses such a technology.

The electrostatic capacitance type touch panel includes a connection terminal disposed in a part of a periphery on the substrate, and the X and Y electrodes are drawn to the connection terminal by drawing wiring lines.

In this case, for example, the drawing wiring lines connected to the X and Y electrodes are different in length, causing a great difference in capacity between the drawing wiring lines themselves and other adjacent drawing wiring lines.

Thus, in the electrostatic capacitance type touch panel configured to obtain a detection output based on a capacity difference of the electrodes at the time of finger nontouching and touching, a difference occurs in detection sensitivities, blocking improvement of detection accuracy.

As countermeasures, a circuit may be disposed to correct the capacity difference between the drawing wiring lines. However, the circuit is disadvantageously enlarged.

SUMMARY OF THE INVENTION

It is an object of the present invention to provide an electrostatic capacitance type touch panel capable of improving detection accuracy by making detection sensitivities uniform without increasing a circuit size.

It is another object of the present invention to provide a screen input display device which includes a touch panel of high detection accuracy to achieve high speed without increasing a circuit size.

Representative aspects of the present invention disclosed herein are briefly outlined below.

(1) According to Item (1) of the present invention, there is provided an electrostatic capacitance type touch panel, comprising:

a substrate;

a plurality of first electrodes disposed in parallel on the substrate;

an insulating film formed so as to cover the plurality of first electrodes;

a plurality of second electrodes disposed in parallel to intersect the plurality of first electrodes on the insulating film;

a plurality of first drawing wiring lines connected to the plurality of first electrodes to be drawn to a connection terminal; and a plurality of second drawing wiring lines connected to the plurality of second electrodes to be drawn to the connection terminal, wherein the plurality of first or second drawing wiring lines have different lengths, larger widths as the lengths are shorter, and larger intervals between adjacent two of the plurality of first or second drawing wiring lines as the lengths are longer.

(2) According to Item (2) of the present invention, in the electrostatic capacitance type touch panel of the invention according to Item (1), each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

(3) According to Item (3) of the present invention, in the electrostatic capacitance type touch panel of the invention according to Item (1), the plurality of first electrodes comprise a transparent conductive layer;

the plurality of first drawing wiring lines are formed into a two-layer structure including a transparent conductive layer and a metal layer;

the plurality of second electrodes comprise a transparent conductive layer; and the plurality of second drawing wiring lines are formed into a two-layer structure including a transparent conductive layer and a metal layer.

(4) According to Item (4) of the present invention, there is provided an electrostatic capacitance type touch panel, comprising:

a substrate;

a plurality of first electrodes disposed in parallel on the substrate;

an insulating film formed so as to cover the plurality of first electrodes;

a plurality of second electrodes disposed in parallel to intersect the plurality of first electrodes on the insulating film;

a plurality of first drawing wiring lines connected to the plurality of first electrodes to be drawn to a connection terminal; and a plurality of second drawing wiring lines connected to the plurality of second electrodes to be drawn to the connection terminal, wherein:

the plurality of first drawing wiring lines have different lengths, larger widths as the lengths are shorter, and larger intervals between adjacent two of the plurality of first drawing wiring lines as the lengths are longer; and the plurality of second drawing wiring lines have different lengths, larger widths as the lengths are shorter, and larger intervals between adjacent two of the plurality of second drawing wiring lines as the lengths are longer.

(5) According to Item (5) of the present invention, in the electrostatic capacitance type touch panel of the invention according to Item (4), each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

(6) According to Item (6) of the present invention, in the electrostatic capacitance type touch panel of the invention according to Item (4), the plurality of first electrodes comprise a transparent conductive layer;

the plurality of first drawing wiring lines are formed into a two-layer structure including a transparent conductive layer and a metal layer;

the plurality of second electrodes comprise a transparent conductive layer; and the plurality of second drawing wiring lines are formed into a two-layer structure including a transparent conductive layer and a metal layer.

(7) According item (7) of the present invention, there is provided a screen input display device, comprising:

a display device; and an electrostatic capacitance type touch panel disposed in at least a display area of the display device, wherein:

the electrostatic capacitance type touch panel comprises:

a substrate;

a plurality of first electrodes disposed in parallel on the substrate;

an insulating film formed so as to cover the plurality of first electrodes;

a plurality of second electrodes disposed in parallel to intersect the plurality of first electrodes on the insulating film;

a plurality of first drawing wiring lines connected to the plurality of first electrodes to be drawn to a connection terminal; and a plurality of second drawing wiring lines connected to the plurality of second electrodes to be drawn to the connection terminal, wherein the plurality of first or second drawing wiring lines have different lengths, larger widths as the lengths are shorter, and larger intervals between adjacent two of the plurality of first or second drawing wiring lines as the lengths are longer.

(8) According to Item (8) of the present invention, in the screen input display device of the invention according to Item (7), each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

(9) According to Item (9) of the present invention, in the screen input display device of the invention according to Item (7), the plurality of first electrodes comprise a transparent conductive layer;

the plurality of first drawing wiring lines are formed into a two-layer structure including a transparent conductive layer and a metal layer;

the plurality of second electrodes comprise a transparent conductive layer; and the plurality of second drawing wiring lines are formed into a two-layer structure including a transparent conductive layer and a metal layer.

(10) According to Item 10 of the present invention, there is provided a screen input display device, comprising:

a display device; and an electrostatic capacitance type touch panel disposed in at least a display area of the display device, wherein:

the electrostatic capacitance type touch panel comprises:

a substrate;

a plurality of first electrodes disposed in parallel on the substrate;

an insulating film formed so as to cover the plurality of first electrodes;

a plurality of second electrodes disposed in parallel to intersect the plurality of first electrodes on the insulating film;

a plurality of first drawing wiring lines connected to the plurality of first electrodes to be drawn to a connection terminal; and a plurality of second drawing wiring lines connected to the plurality of second electrodes to be drawn to the connection terminal, wherein the plurality of first drawing wiring lines have different lengths, larger widths as the lengths are shorter, and larger intervals between adjacent two of the plurality of first drawing wiring lines as the lengths are longer; and the plurality of second drawing wiring lines have different lengths, larger widths as the lengths are shorter, and larger intervals between adjacent two of the plurality of second drawing wiring lines as the lengths are longer.

(11) According to Item (11) of the present invention, in the screen input display device of the invention according to Item (10), each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

(12) According to Item (12) of the present invention, in the screen input display device of the invention according to Item (10), the plurality of first electrodes comprise a transparent conductive layer;

the plurality of first drawing wiring lines are formed into a two-layer structure including a transparent conductive layer and a metal layer;

the plurality of second electrodes comprise a transparent conductive layer; and the plurality of second drawing wiring lines are formed into a two-layer structure including a transparent conductive layer and a metal layer.

The present invention is not limited to those structures. Various changes can be made without departing from technical ideas of the present invention. Other components of the present invention become apparent upon reading the detailed description of the present invention in conjunction with the drawings.

The electrostatic capacitance type touch panel of the present invention improves detection accuracy by making detection sensitivities uniform.

The screen input display device of the present invention includes the touch panel of high detection accuracy and achieves high speed.

Other effects of the present invention become apparent upon reading the detailed description of the present invention.

BRIEF DESCRIPTION OF THE DRAWINGS

In the accompanying drawings:

FIG. 2 is an enlarged diagram of a portion in a broken-line frame of FIG. 1;

DETAILED DESCRIPTION OF THE INVENTION

Figure 1:
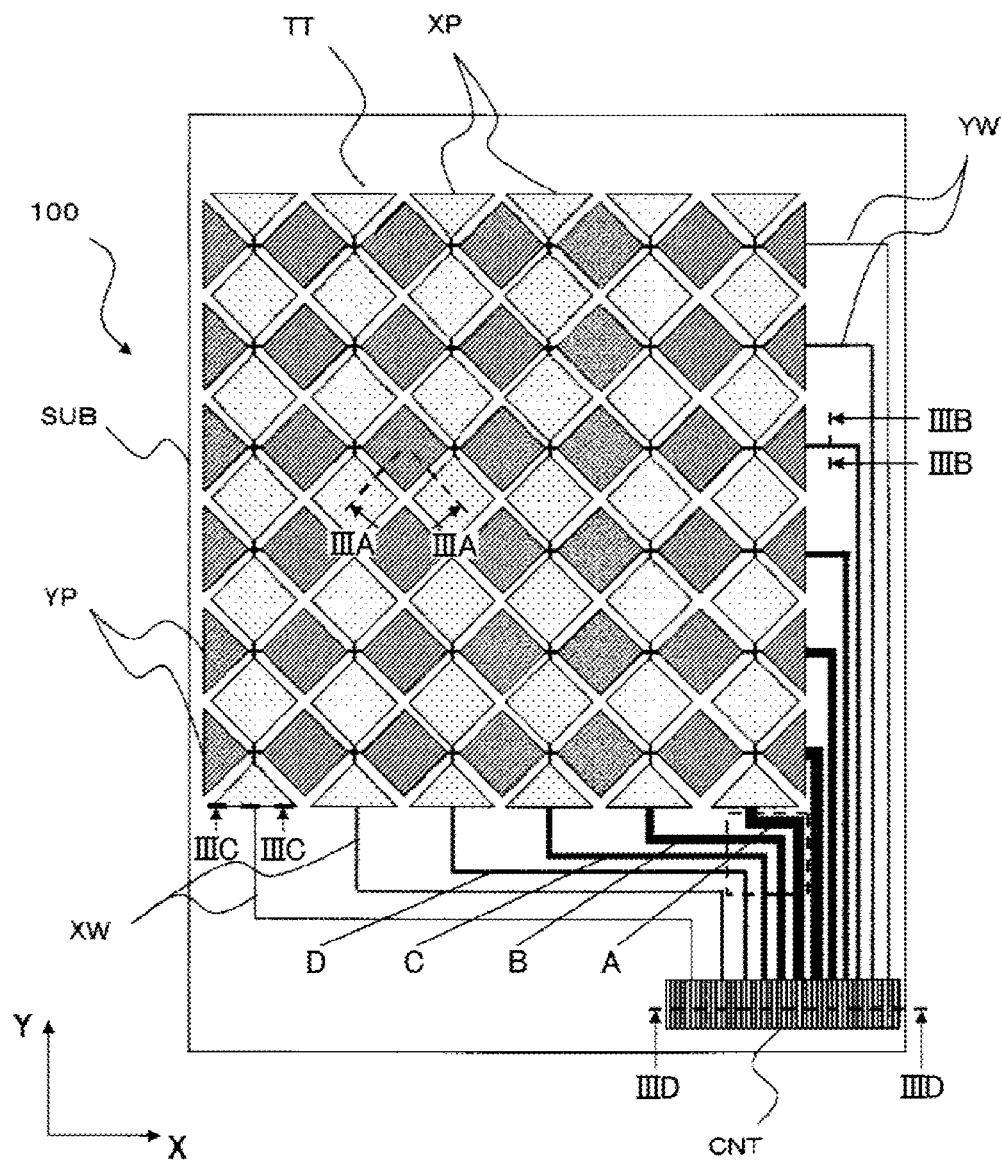
FIG. 1 is a plan diagram illustrating an electrostatic capacitance type touch panel according to an embodiment of the present invention.

Preferred embodiments of the present invention are described with reference to the drawings. In the drawings and the embodiments, identical or similar components are denoted by similar reference numerals, and description thereof is omitted.

First Embodiment

Figure 3A:
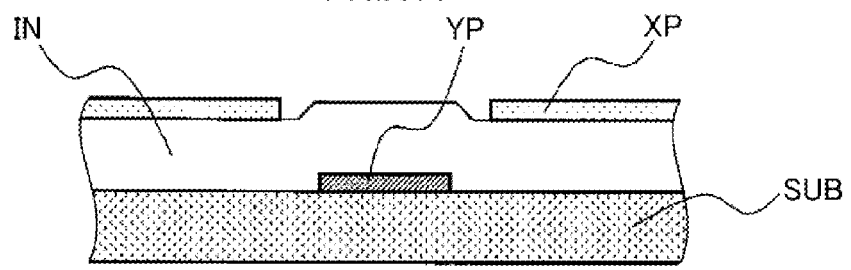
FIG. 3A is a sectional diagram cut on a line IIIA-IIIA of FIG. 1.
Figure 3B:
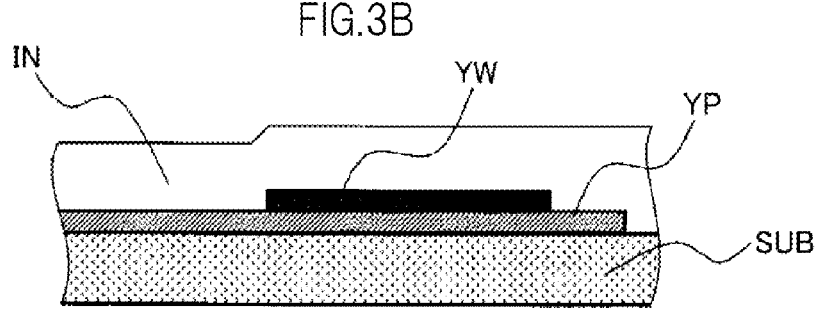
FIG. 3B is a sectional diagram cut on a line IIIB-IIIB of FIG. 1.
Figure 3C:
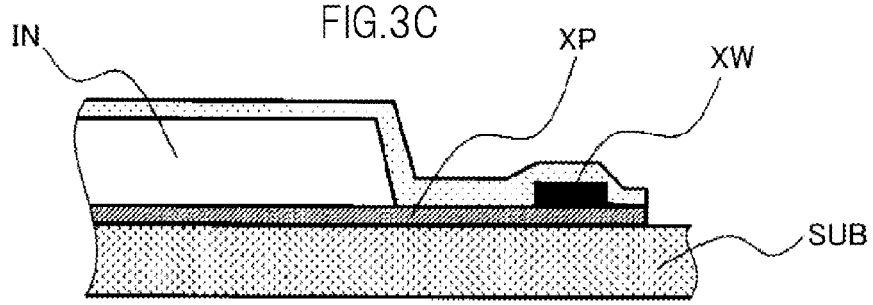
FIG. 3C is a sectional diagram cut on a line IIIC-IIIC of FIG. 1.
Figure 3D:
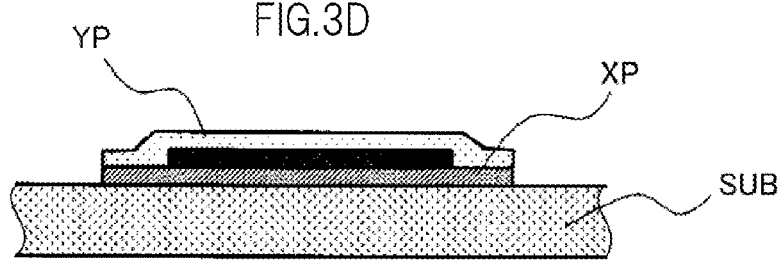
FIG. 3D is a sectional diagram cut on a line IIID-IIID of FIG. 1.

FIG. 1 is a schematic plan diagram illustrating an electrostatic capacitance type touch panel according to a first embodiment of the present invention. FIG. 3A is a sectional diagram cut on a line IIIA-IIIA of FIG. 1, FIG. 3B is a sectional diagram cut on a line IIIB-IIIB, FIG. 3C is a sectional diagram cut on a line IIIC-IIIC, and FIG. 3D is a sectional diagram cut on a line IIID-IIID, The electrostatic capacitance type touch panel (touch panel 100 hereinafter) is formed by sequentially laminating, for example, on a main surface of a transparent substrate SUB made of glass, (e.g., six) Y electrodes YP disposed in parallel in an Y direction to extend in a X direction of FIG. 1, an insulating film IN (refer to FIGS. 3A to 3D) formed to cover the Y electrodes YP, and (e.g., six) X electrodes XP disposed in parallel in the X direction to extend in the Y direction of FIG. 1.

The Y electrode YP is formed by a transparent conductive film of, for example, indium tin oxide (ITO). The Y electrode YP is formed into a pattern where wide portions (may be referred to as pad portions) and narrow portions (may be referred to as linear portions) are alternately arrayed in the extending direction. The other Y electrodes YP arranged in parallel have similar patterns. In each Y electrode YP, the pad portion and the linear portion are arranged in the X direction of FIG. 1. For example, the pad portion is formed into a diamond shape connected to the linear portion at a pair of opposing corners.

The X electrode XP is similarly formed by a transparent conductive film of, for example, indium tin oxide (ITO). The X electrode XP is formed into a pattern where wide portions (may be referred to as pad portions) and narrow portions (may be referred to as linear portions) are alternately arrayed in the extending direction. The other X electrodes XP arranged in parallel have similar patterns. In each X electrode XP, the pad portion and the linear portion are arranged in the Y direction of FIG. 1. For example, the pad portion is formed into a diamond shape connected to the linear portion at a pair of opposing corners.

In plan view, for example, the X and Y electrodes XP and YP intersect each other at the linear portions, and the pad portions of the X and Y electrodes XP and YP are formed not to overlap each other. In other words, the Y electrode YP is formed to surround a diamond area by four adjacent pad portions. In the diamond area, the pad portion of the X electrode XP is disposed to have spaces with the four pads of the Y electrode YP. Thus, the pad portions of the X and Y electrodes XP and YP are arranged in a staggered manner on a center of the transparent substrate SUB excluding its periphery.

The area where the X and Y electrodes XP and YP are formed as described above may be referred to as an electrode forming area TT below.

Each Y electrode YP is connected to a drawing wiring line YW extending in the X direction of FIG. 1 in, for example, an end of the right side of FIG. 1. The drawing wiring line YW is bent in the Y direction of FIG. 1, and then connected to a connection terminal CNT disposed on, for example, a lower right side of the transparent substrate SUB illustrated in FIG. 1. Each X electrode XP is connected to a drawing wiring line XW extending in the Y direction of FIG. 1 in, for example, an end of the lower side of FIG. 1. The drawing wiring line XW is bent in the X direction of FIG. 1 and then connected to the connection terminal CNT.

On the transparent substrate SUB, the drawing wiring lines YW and XW respectively connected to the Y electrode YP and the X electrode XP, and the connection terminal CNT are formed in an area outside the electrode forming area TT. The area outside the electrode forming area TT on the transparent substrate SUB may be referred to as a frame below.

FIG. 2 is an enlarged diagram illustrating a portion in a broken-line frame of FIG. 1. FIG. 2 illustrates a part of each drawing wiring line XW for guiding the X electrode XP to the connection terminal CNT. Because of positioning of the connection terminal CNT on the right side of FIG. 2 with respect to the electrode forming area TT, among the drawing wiring lines XW illustrated in FIG. 2, the drawing wiring line XW (Line (A)) positioned on the right side is shortest, and the drawing wiring lines XW (Line (B)), XW (Line (C)), XW (Line (D)), . . . arranged on the left side are gradually longer in this order. In this case, a relationship of Wa>Wb>Wc>

Wd> ... is established, where Wa to Wd respectively denote widths of the drawing wiring lines XW (Line (A)), XW (Line (B)), XW (Line (C)), and XW (Line (D)). A relationship of Sa<Sb<Sc< ... is established, where Sa to Sc respectively denote intervals between the drawing wiring lines XW (Line (A)) and XW (Line (B)), between the drawing wiring lines XW (Line (B)) and XW (Line (C)), and between the drawing wiring lines XW (Line (C)) and XW (Line (D)).

The width of the drawing wiring line XW can be reduced to a level which causes no problem with wiring line resistance in driving of the touch panel 100, and the wiring line interval can be reduced to a level permitted by a frame space of the touch panel 100. Thus, a wiring line width and a wiring line interval can be set according to design values of wiring line resistance and a frame space.

Configuring the drawing wiring line XW in this manner enables reductions of an inter-wiring line capacity CL and a ground capacity CG of long drawing wiring lines, and a capacity difference (difference in terminal capacity Cp) between the X electrode XP and the drawing wiring line XW (may be referred to as a detection electrode wiring line hereinafter) as described below.

FIG. 2 is the enlarged diagram of the portion in the broken-line frame of FIG. 1, illustrating a configuration of the drawing wiring line XW connected to the X electrode XP. As can be seen in FIG. 1, a similar configuration is employed for the drawing wiring line YW connected to the Y electrode YP. In other words, widths of the drawing wiring lines YW are sequentially smaller and intervals between adjacent drawing wiring lines YW are sequentially larger, as lengths thereof are longer.

As illustrated in FIG. 2, each drawing wiring line YW is formed into a two-layer structure including a transparent conductive layer ITO made of ITO and a metal layer MT made of aluminum or chrome. In other words, the transparent conductive layer ITO is formed as an extending portion of the Y electrode YP, and the metal layer MT is laminated on the extending portion. In this way, connection between the Y electrode YP and the drawing wiring line YW can be reliable, and electrical resistance can be reduced.

Figure 4:
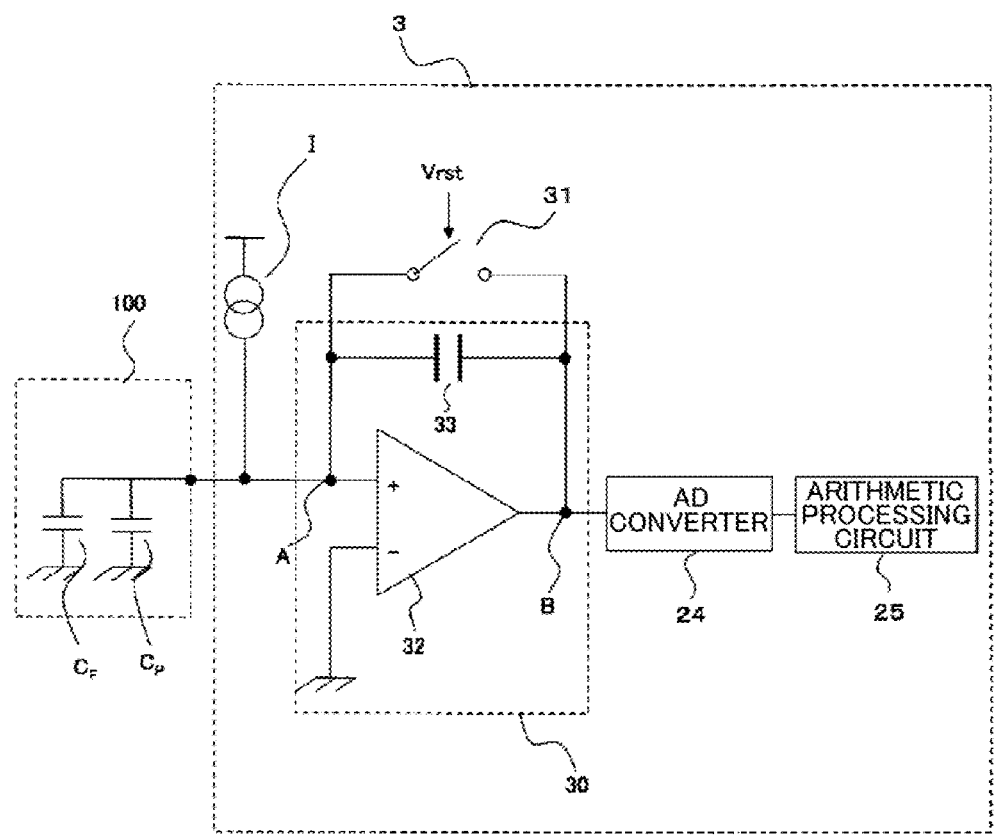
FIG. 4 is a circuit diagram illustrating a controller connected to the electrostatic capacitance type touch panel according to an embodiment of the present invention.

FIG. 4 is a circuit diagram illustrating an embodiment of a configuration of a controller 3 when the touch panel 100 is connected to the controller 3.

In FIG. 4, the controller 3 includes an integration circuit 30 connected to the touch panel 100, an AD converter 24 connected to the integration circuit 30, and an arithmetic processing circuit 25 connected to the AD converter 24.

The integration circuit 30 is configured by connecting an integration capacity (Cc) 33 and a reset switch 31 to an I/O terminal of an operational amplifier 32 in parallel. An input terminal of the operational amplifier 32 is a node A connected to, for example, the X electrode XP of the touch panel 100, and a current source I is connected to the node A. Charges generated at a terminal capacity Cp of the touch panel 100 and a finger touch capacity Cf are stored in the integration capacity (Cc) 33. An output voltage of an output terminal (node B) of the operational amplifier 32 is determined based on a ratio of the integration capacity (Cc) 33 to (Cp+Cf). The integration capacity (Cc) 33 accordingly becomes a parameter to determine sensitivities.

The reset switch 31 is controlled based on a clock signal Vrst turned on/off at a predetermined period, and detection time is controlled.

An output from the integration circuit 30 is digitized via the AD converter 24, and then the arithmetic processing circuit 25 calculates X and Y coordinates of a finger which has touched the touch panel 100.

In this configuration, a circuit for conversion into time may be applied to an AD conversion unit in place of the AD converter 24. The configuration of the controller 3 is only exemplary. Any configuration can be employed as long as a change in capacity or charges can be detected.

Figure 5:
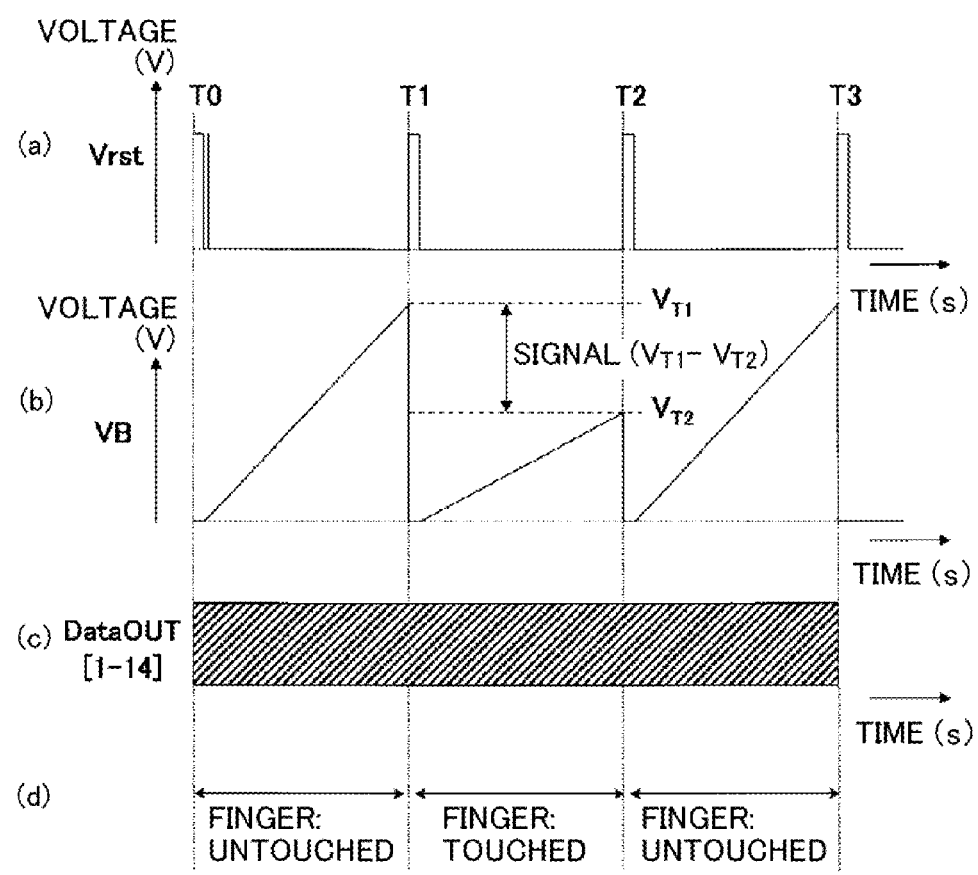
FIG. 5 illustrates signal detection of the electrostatic capacitance type touch panel.

FIG. 5 is a timing chart illustrating an operation sequence of the integration circuit 30. Section (a) illustrates the clock signal Vrst for turning on the reset switch 31, Section (b) illustrates a voltage of the node B, Section (c) illustrates an output from the AD converter 24, and Section (d) illustrates whether a finger is in touch with the touch panel 100. In FIG. 5, the clock signals Vrst are output at times T0, T1, T2, and T3. A finger is not in touch between the times T0 and T1, in touch between the times T1 and T2, and not in touch between the times T2 and T3.

A voltage of the node A (FIG. 4) is determined based on time when the current source I is charged to, for example, a terminal capacity Cp of the X electrode XP during nontouching of a finger, and based on time when the current source I is charged to a terminal capacity Cp of the X electrode XP and a capacity Cf during touching of a finger. A voltage of the node B (FIG. 4) becomes equal to a ground level when the reset switch 31 is turned on by the clock signal Vrst.

A voltage of the node B at the time T2 when the finger touches is denoted by V(T2), and a voltage of the node B at the time T1 when the finger does not touch is denoted by V(T1).

A difference between the voltages is indicated by a signal component, and represented by the following expression (1).

$$V(T2)-V(T1)=ItCc/Cp-ItCc/(Cf+Cp)=Cf Cp/(Cf+Cp) \over Cc \qquad (1)$$

where Cp denotes a terminal capacity, Cf denotes a capacity during touching of a finger, I denotes a current value of the current source I, and Cc denotes an integration capacity of the integration circuit 30.

As apparent from the expression (1), a signal is determined based on a ratio of the terminal capacity Cp of the touch panel 100 to the capacity Cf during touching of the finger. To improve sensitivities, the capacity Cp is reduced, or the capacity Cf is increased. The increase of the capacity Cf necessitates enlargement of an electrode, which is a trade-off with coordinate detection resolution. Thus, reduction of the terminal capacity Cp is preferable, and sensitivities and an S/N ratio can be improved. Reducing an inter-terminal difference of the terminal capacity Cp enables improvement of sensitivity uniformity in a panel surface.

Figure 6:
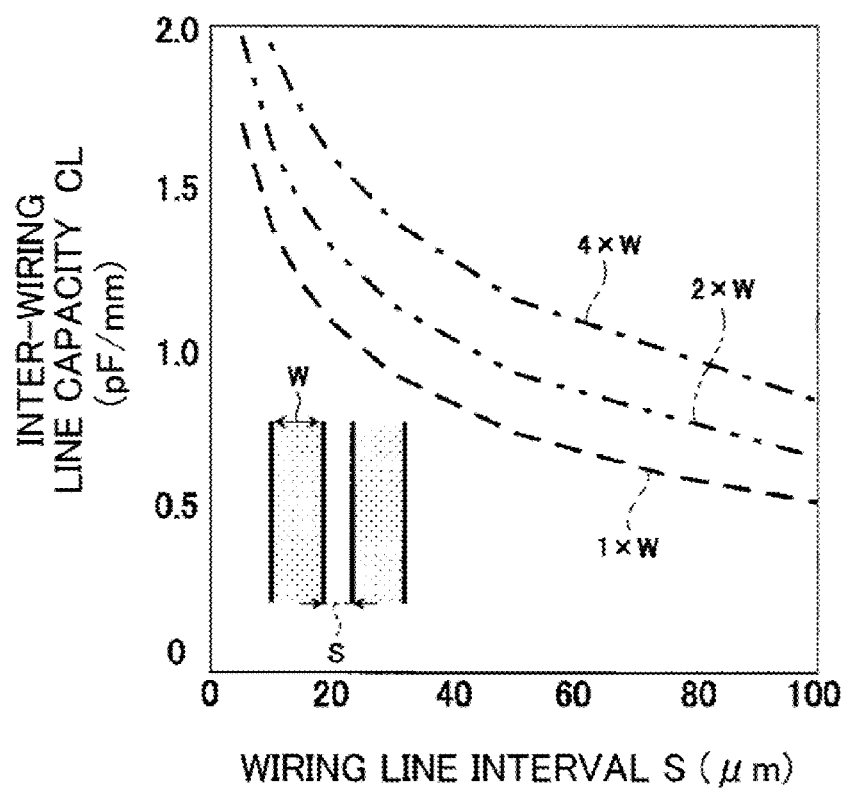
FIG. 6 is a graph illustrating effects of the present invention.

FIG. 6 is a graph illustrating a wiring line width as a parameter in a relationship between an inter-wiring line capacity CL and a wiring line interval S of the adjacent drawing wiring lines XW and YW. In the graph, an abscissa indicates a wiring line interval S (μm), and an ordinate indicates an inter-wiring line capacity CL (pF/mm). As apparent from FIG. 6, the inter-wiring line capacity CL is reduced by increasing the wiring line interval S from 0 μm to 100 μm. The inter-wiring line capacity CL is increased by enlarging the wiring line widths to 1×W, 2×W, and 4×W. From this graph, the inter-wiring line capacity CL is formulated, which is represented by the following expression (2).

$$CL = \epsilon_0 \epsilon_r W^{0.13} S^{-0.13} L \qquad (2)$$

where $\epsilon_0$ denotes a vacuum dielectric constant, and $\epsilon_r$ denotes a specific dielectric constant of the transparent substrate SUB.

As can be understood from the expression (2), the inter-wiring line capacity CL depends on a wiring line width W and a wiring line interval S. Presuming that a wiring line length L is constant, to reduce the inter-wiring line capacity CL, preferably, the wiring line interval S is set large, and the wiring line width W is set small.

Figure 7:
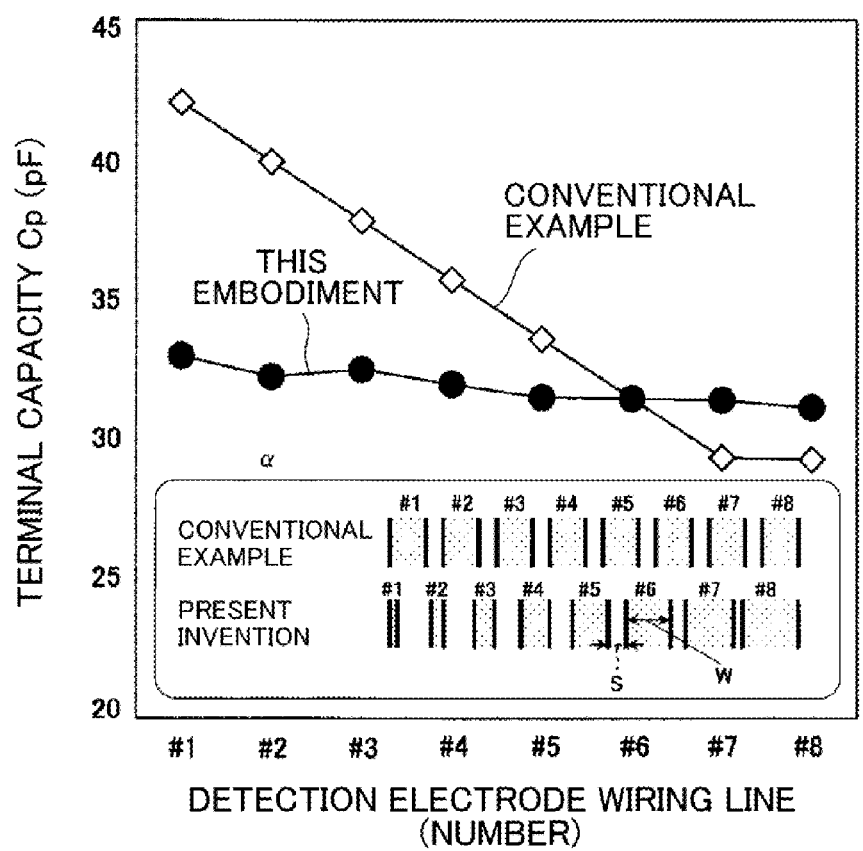
FIG. 7 is a graph illustrating effects of the present invention.

FIG. 7 is a graph illustrating terminal capacities Cp of adjacently arranged detection electrode wiring lines. In the graph, an abscissa indicates detection electrode wiring lines (#1 to #8), and an ordinate indicates terminal capacities (pF) of the detection electrode wiring lines.

As illustrated in a solid-line frame α of FIG. 7, the detection electrode wiring lines #1 to #8 are larger in wiring line width W and wiring line intervals S with other adjacent detection electrode wiring lines are smaller in this order. In this case, though not illustrated in FIG. 7, the detection electrode wiring lines #1 to #8 are shorter in length in this order. For comparison, corresponding to the detection electrode wiring lines, conventional detection electrode wiring lines are equal in wiring line width W and in wiring line interval S.

The terminal capacity Cp is generated in the detection electrode wiring line, and a sum total of a detection electrode capacity C(PIX), an inter-wiring line capacity Cs, and a counter ground capacity Cg of a drawing wiring line.

FIG. 7 illustrates terminal capacities Cp of the conventional detection electrode wiring lines. The terminal capacities Cp of the conventional detection electrode wiring lines #1 to #8 are smaller in this order. It is because the detection electrode wiring lines #1 to #8 are shorter in length in this order.

On the other hand, in the configuration of the detection electrode wiring lines of this embodiment, the terminal capacities Cp of the detection electrode wiring lines #1 to #8 are almost constant. In other words, a capacity difference among the detection electrode wiring lines can be reduced. It is because as described above, in each detection electrode wiring line, a wiring line width W and a wiring line interval S are optimally adjusted.

Second Embodiment

Figure 8:
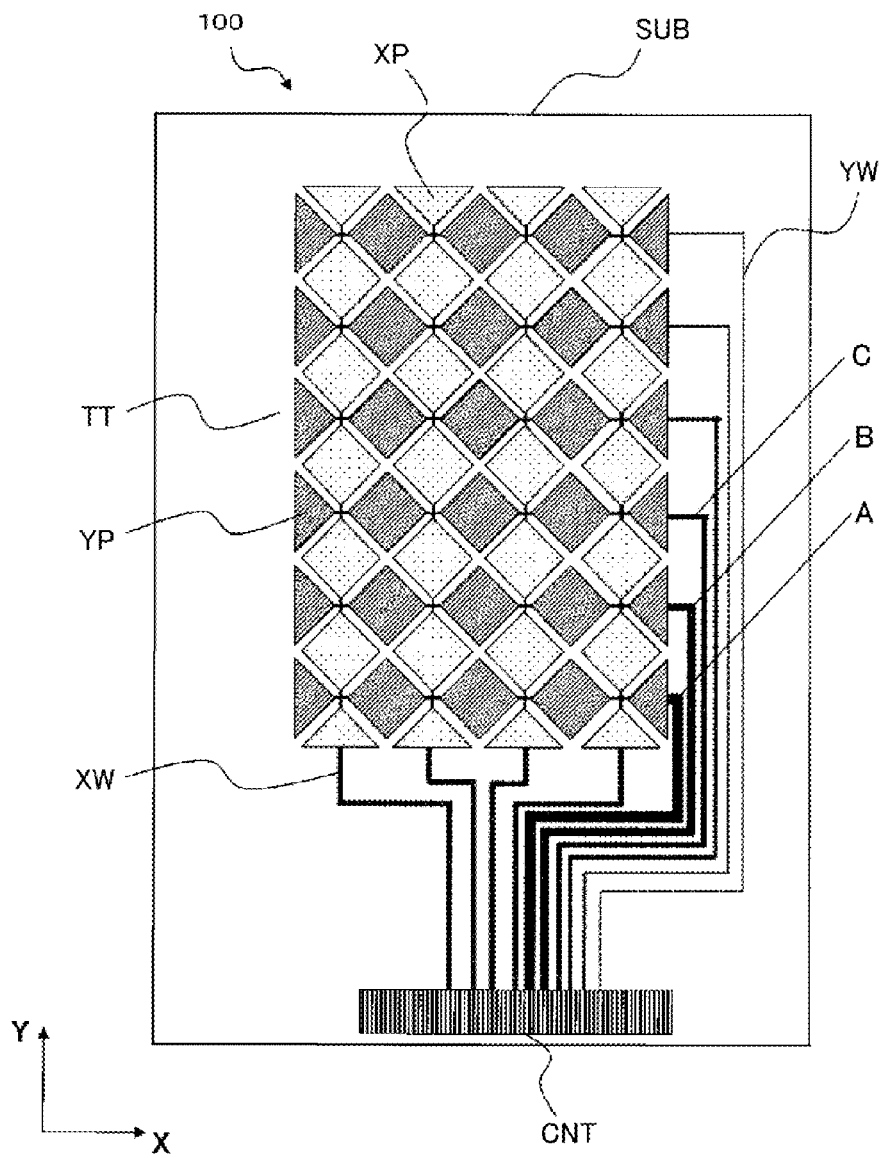
FIG. 8 is a plan diagram illustrating an electrostatic capacitance type touch panel according to another embodiment of the present invention.

FIG. 8 is a schematic plan diagram illustrating an electrostatic capacitance type touch panel according to another embodiment of the present invention, and corresponding to FIG. 1.

A difference in configuration from FIG. 1 is that the number of X electrodes XP is, for example, four which is smaller than that of Y electrodes YP. An FPC terminal is disposed almost directly below an electrode forming area TT. Thus, there is no big difference in length among drawing wiring lines XW from the X electrodes XP to the FPC terminal while there is a big difference in length among drawing wiring lines YW from the Y electrodes YP to the FPC terminal.

Thus, the present invention is applied to the drawing wiring lines YW from the Y electrodes YP, but not applied to any drawing wiring lines XW from the X electrodes XP. In other words, as illustrated in FIG. 8, the drawing wiring lines YW from the Y electrodes YP are drawing wiring lines YW (Line (A)), YW (Line (B)), YW (Line (C)), . . . in order of nearness to the FPC terminal. Line widths are set smaller in order of the drawing wiring lines YW (Line (A)), YW (Line (B)), YW (Line (C)), . . . . Wiring line intervals are larger between the drawing wiring lines YW (Line (A)) and YW (Line (B)), between the drawing wiring lines YW (Line (B)) and YW (Line (C)), between the drawing wiring lines YW (Line (C)) and YW (Line (D)), . . . in this order.

Third Embodiment

Figure 9:
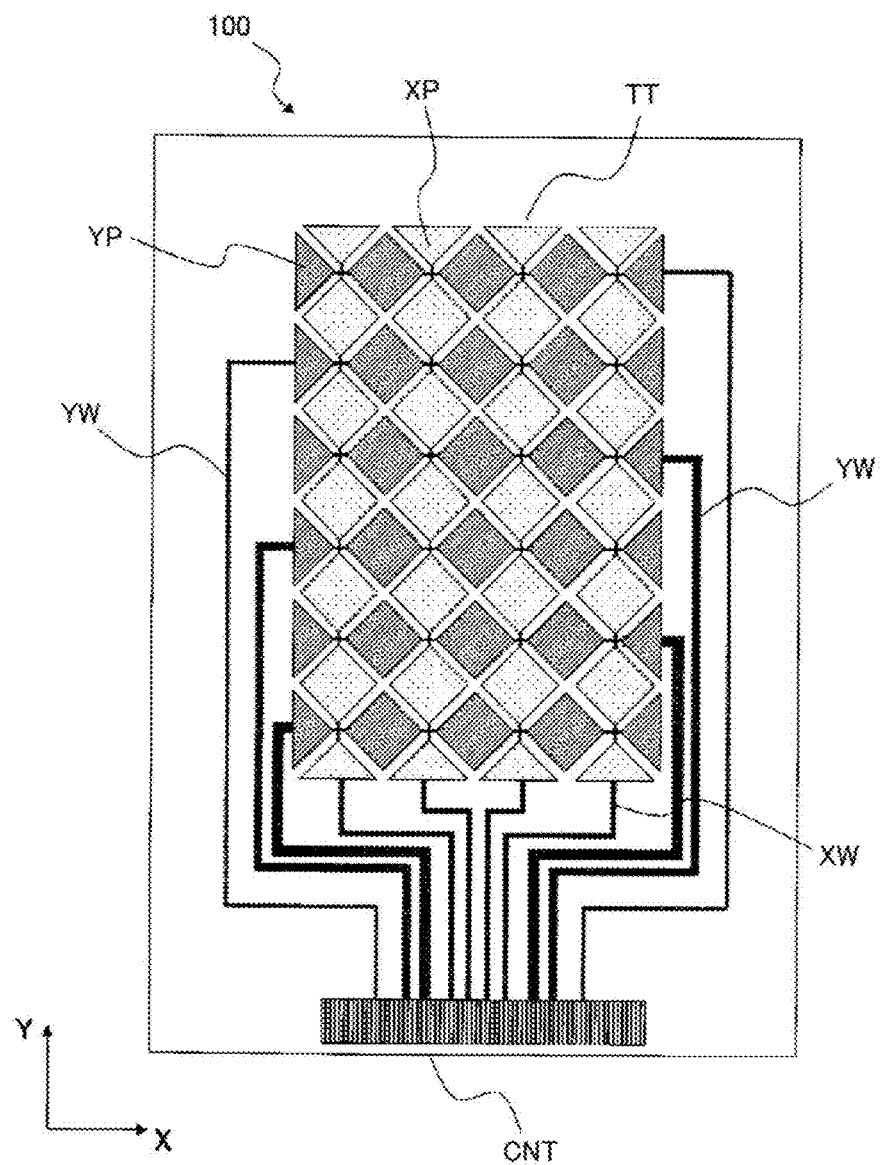
FIG. 9 is a plan diagram illustrating an electrostatic capacitance type touch panel according to still another embodiment of the present invention.

FIG. 9 is a schematic plan diagram illustrating an electrostatic capacitance type touch panel according to another embodiment of the present invention, and corresponding to FIG. 8.

A difference in configuration from FIG. 8 is that drawing wiring lines YW from Y electrodes YP to an FPC terminal are drawn from both sides (left and right of FIG. 9) of an electrode forming area TT.

In other words, from the left side of the electrode forming area TT of FIG. 9, odd-number drawing wiring lines YW counted from the FPC terminal side are drawn to be guided to the FPC terminal. From the right side of the electrode forming area TT of FIG. 9, even-number drawing wiring lines YW counted from the FPC terminal side are drawn to be guided to the FPC terminal.

In this case, as described above, according to lengths of the drawing wiring lines YW, wiring line widths are set, and wiring line intervals with the other adjacent drawing wiring lines YW are set. Thus, when the drawing wiring lines are drawn from both sides of the forming areas of the X and Y electrodes XP and YP, the wiring line widths and the wiring line intervals of the drawing wiring lines can be increased by effectively utilizing a frame space. When there is a margin in the inter-wiring line capacity CL, the frame space can be reduced.

Fourth Embodiment

Figure 10:
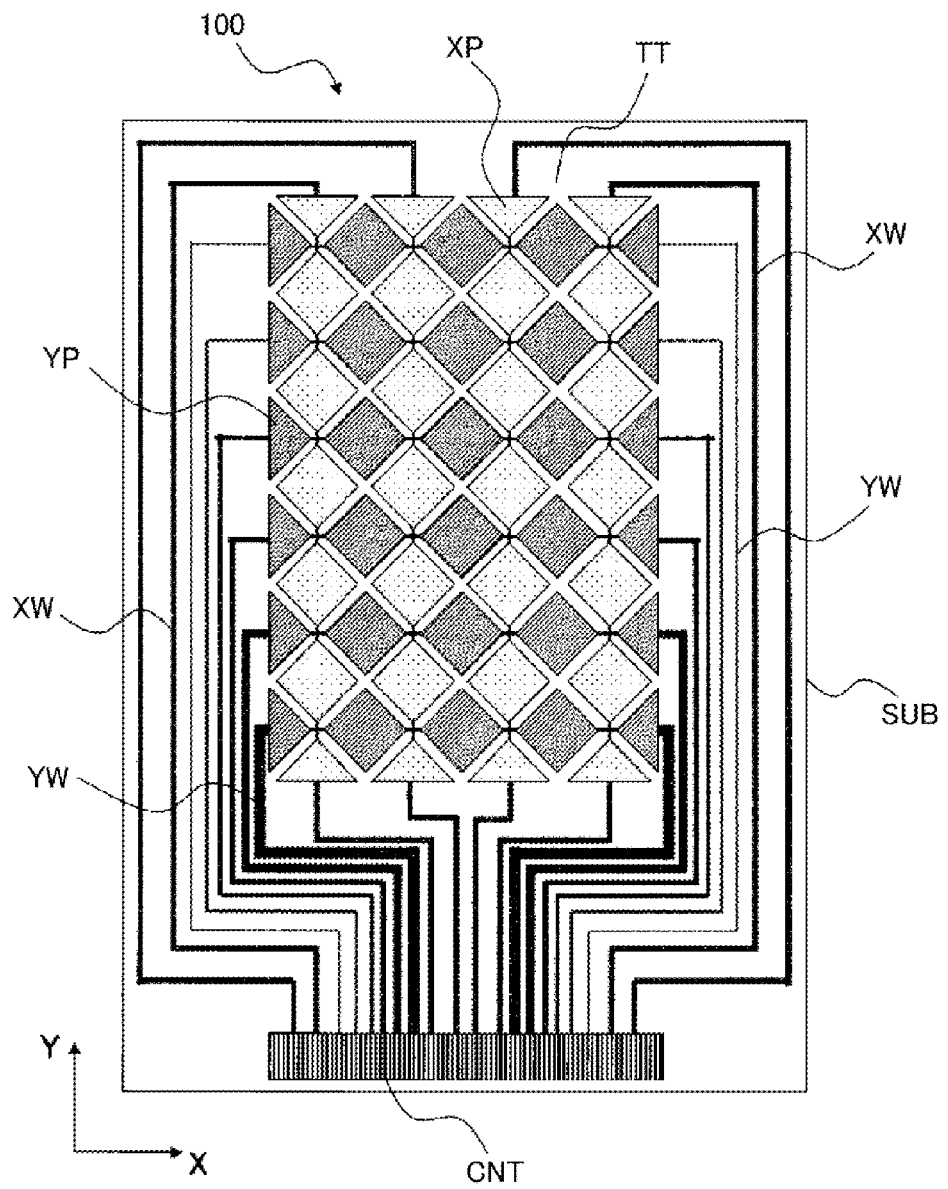
FIG. 10 is a plan diagram illustrating an electrostatic capacitance type touch panel according to a further embodiment of the present invention.

FIG. 10 is a schematic plan diagram illustrating an electrostatic capacitance type touch panel according to another embodiment of the present invention, and corresponding to FIG. 9.

A difference in configuration from FIG. 9 is that drawing wiring lines YW from Y electrodes YP to an FPC terminal are all drawn from both sides (left and right of FIG. 10) of an electrode forming area TT. In FIG. 10, drawing wiring lines XW from X electrodes XP to the FPC terminal are all drawn from both sides (upper and lower sides of FIG. 10) of forming areas of the X and Y electrodes XP and YP.

In this case, for example, the present invention is applied only to the drawing wiring lines YW from the Y electrodes YP. It is because the drawing wiring lines XW from the X electrodes XP are almost equal in length.

As described above, for each Y electrode YP, signals are supplied from both ends thereof via the drawing wiring line YW. Thus, a driving load of the controller 3 can be ideally halved, preventing a problem of higher resistance caused by thinning of the X and Y electrodes XP and YP. Formation of the drawing wiring lines YW from both sides of the Y electrode YP inevitably leads to an increase of the inter-wiring line capacity CL. Thus, application of the present invention contributes to reduction of the inter-wiring line capacity CL.

Fifth Embodiment

Figure 11:
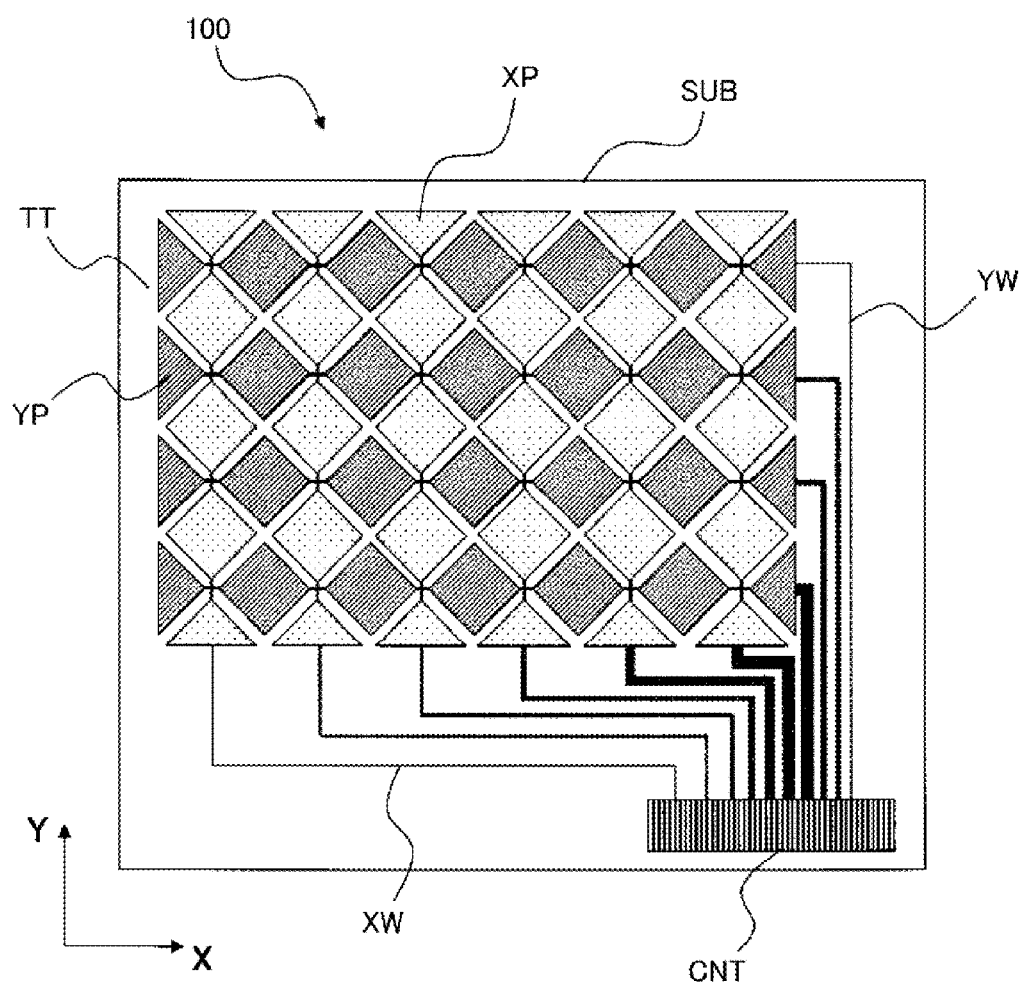
FIG. 11 is a plan diagram illustrating an electrostatic capacitance type touch panel according to a further embodiment of the present invention.

FIG. 11 is a schematic plan diagram illustrating an electrostatic capacitance type touch panel according to another embodiment of the present invention, and corresponding to FIG. 8.

A difference in configuration from FIG. 8 is that an electrode forming area TT is long in an X direction but short in a Y direction. For example, four Y electrodes YP are disposed in parallel, and six X electrodes XP are disposed in parallel.

An FPC terminal is disposed in a lower right side of FIG. 11 with respect to forming areas of the X and Y electrodes XP and YP.

In this case, drawing wiring lines XW from the X electrodes XP to the FPC terminal are different in length, and drawing wiring lines YW from the Y electrodes YP to the FPC terminal are different in length. Thus, the present invention is applied to the drawing wiring lines XW from the X electrodes XP and the drawing wiring lines YW from the Y electrodes YP.

Sixth Embodiment

Figure 12:
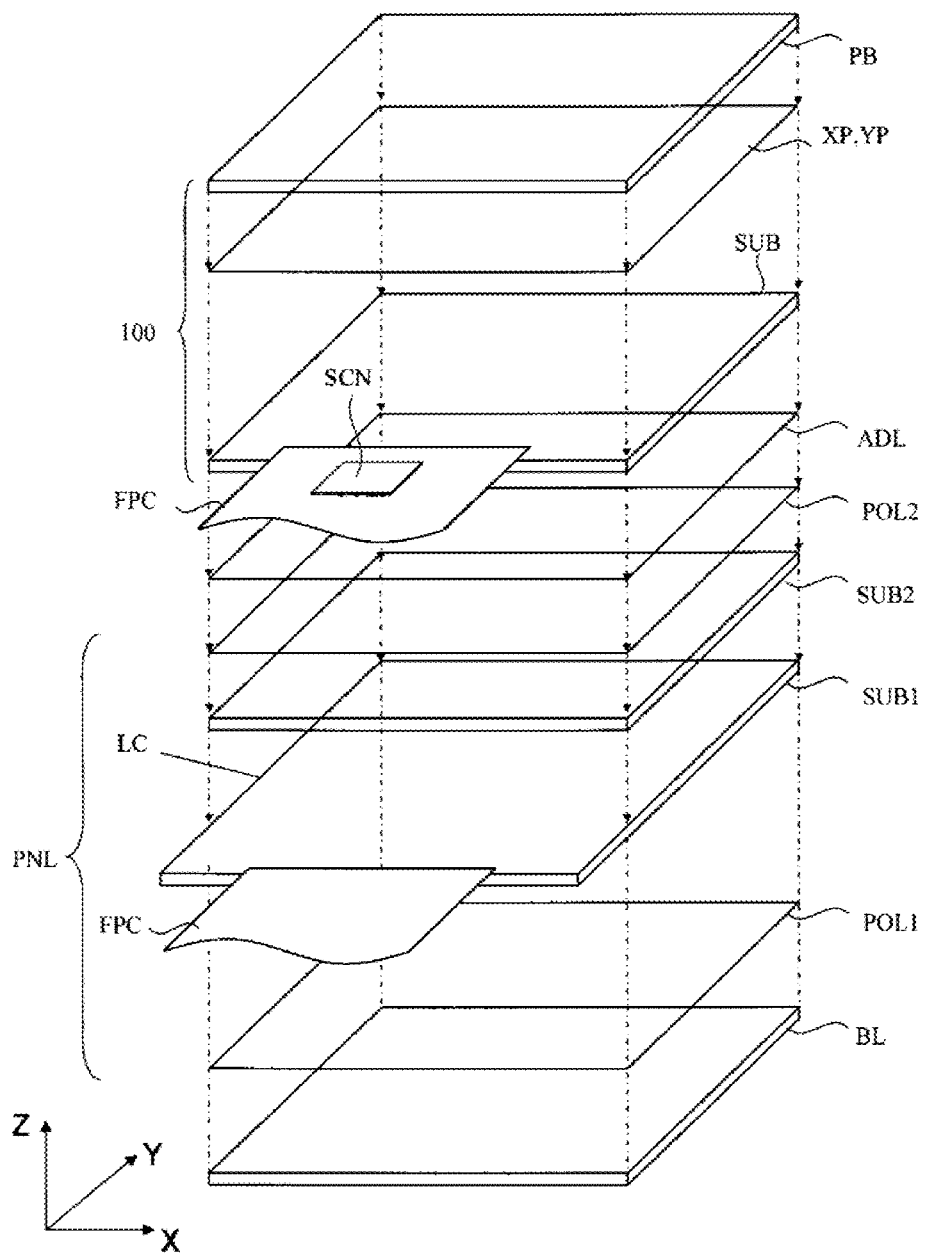
FIG. 12 is an exploded perspective diagram illustrating a display device including an electrostatic capacitance type touch panel according to an embodiment of the present invention.

FIG. 12 is an exploded perspective diagram illustrating a display device which includes the touch panel 100 described above according to an embodiment of the present invention.

For example, a liquid crystal display device is used for the display device. In the liquid crystal display device, a TFT substrate SUB1 and a counter substrate SUB2 sandwiching a liquid crystal LC constitute a liquid crystal display panel PNL. On a surface of the TFT substrate SUB1 on the liquid crystal LC side, a plurality of pixels arranged in matrix are formed, and independently driven by thin-film transistors (not shown) formed adjacently to the pixels. A flexible substrate FPC is connected to the TFT substrate SUB1, and a signal is supplied to each pixel via the flexible substrate FPC. A lower polarizing plate POL1 is disposed on a surface of the TFT substrate SUB1 opposite to the liquid crystal LC, and an upper polarizing plate POL2 is disposed on a surface of the counter substrate SUB2 opposite to the liquid crystal LC, whereby behavior of the liquid crystal LC of each pixel can be made visible.

Each pixel of the liquid crystal display panel PNL includes an element for controlling a light transmission amount, and a backlight BL is disposed on a surface of the liquid crystal display panel PNL opposite to an observer.

The touch panel 100 is disposed on a surface of the liquid crystal display panel PNL on the observer side, and a display area of the liquid crystal display panel PNL can be viewed through the touch panel 100. In the touch panel 100, X and Y electrodes XP and YP are formed on a main surface of the transparent substrate SUB, and an acrylic plate PB is disposed on the surface thereof to protect the X and Y electrodes XP and YP. The touch panel 100 is bonded to the liquid crystal display panel via an adhesive layer ADL.

Seventh Embodiment

Figure 13:
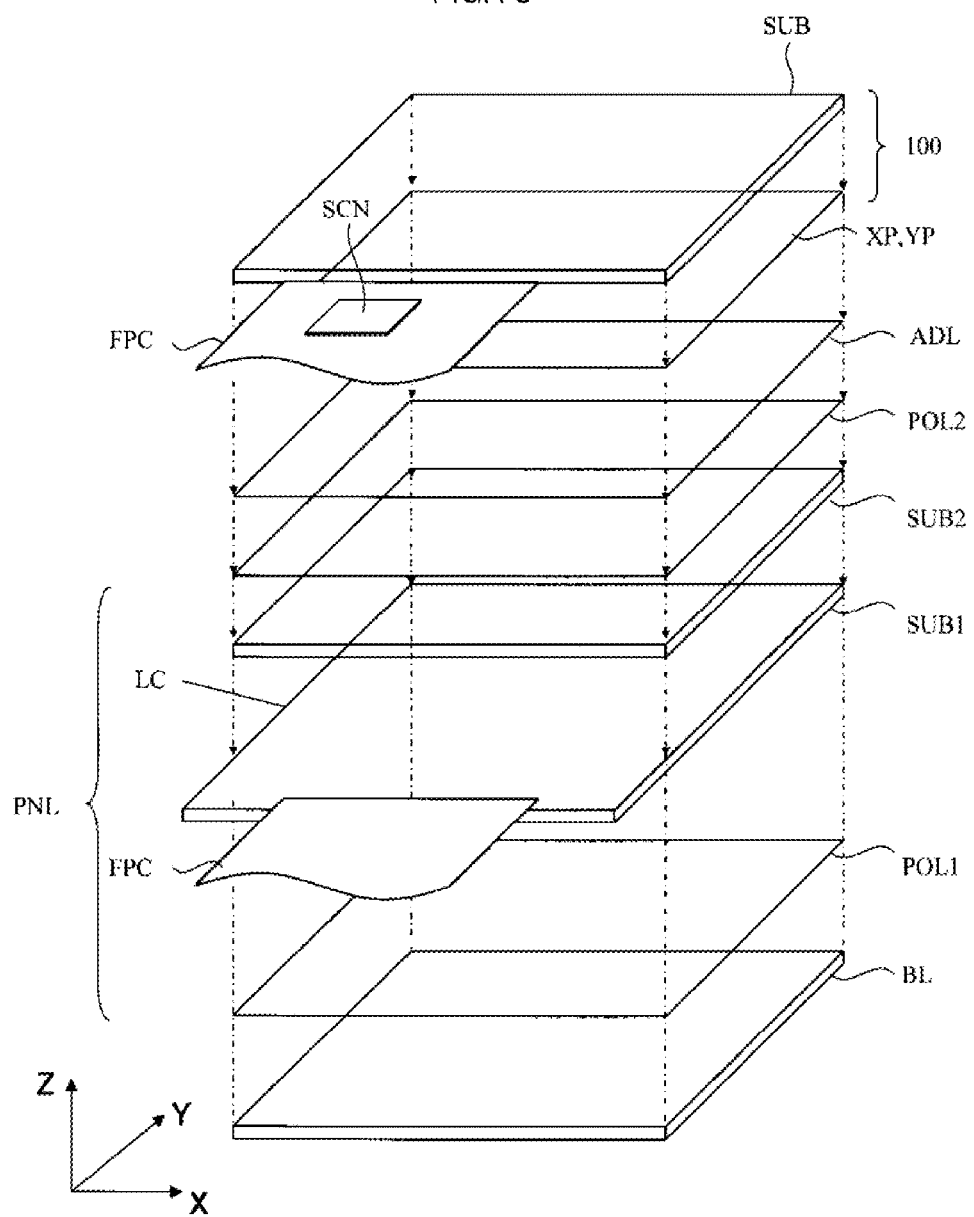
FIG. 13 is an exploded perspective diagram illustrating a display device including an electrostatic capacitance type touch panel according to another embodiment of the present invention.

FIG. 13 is an exploded perspective diagram illustrating a display device which includes the touch panel 100 according to another embodiment of the present invention, and corresponding to FIG. 12.

A difference in configuration from FIG. 12 is that X and Y electrodes XP and YP of the touch panel 100 are formed on a surface of a transparent substrate SUB on a liquid crystal display panel side. The touch panel 100 is bonded to the liquid crystal display panel via an adhesive layer ADL on the surface where the X and Y electrodes XP and YP have been formed. This configuration enables the transparent substrate SUB also to protect the X and Y electrodes XP and YP. Thus, the touch panel 100 itself can be thinned.

Eighth Embodiment

Figure 14:
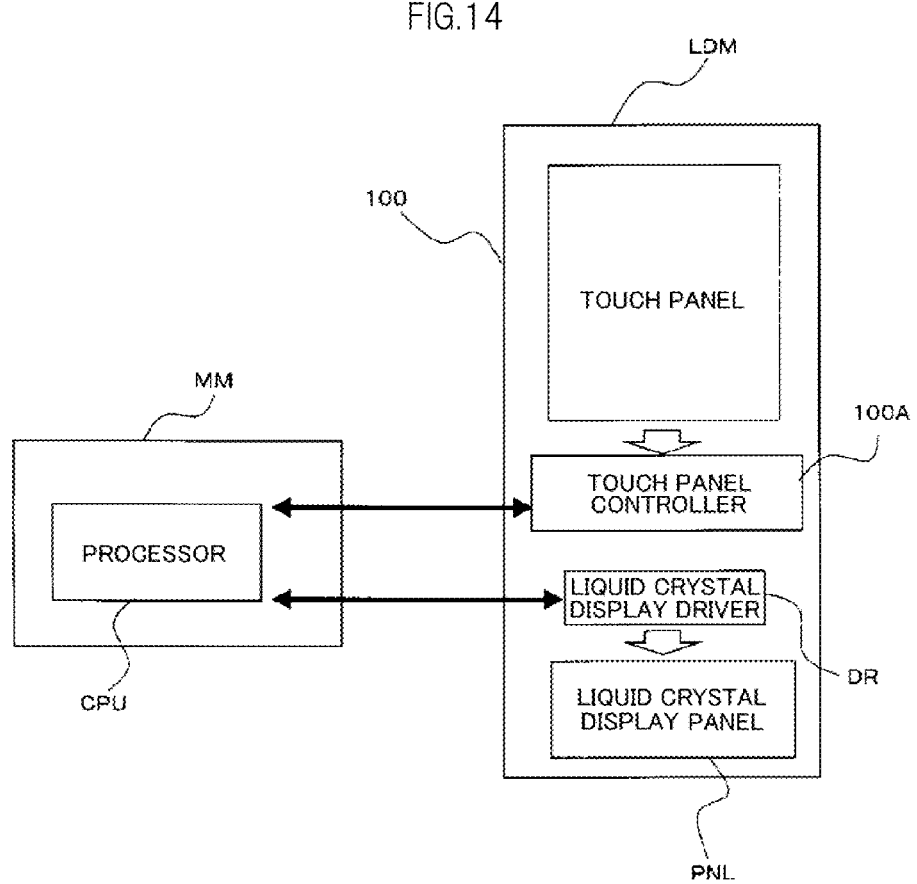
FIG. 14 illustrates a system configuration of a screen input image display device including a touch panel.

FIG. 14 illustrates a system configuration when a display device includes the touch panel 100 to be configured as a so-called screen input image display device.

For example, the screen input image display device includes a liquid crystal display module LDM and a mobile device main body MM. The liquid crystal display module LDM includes the touch panel 100 including a touch panel controller 100A, and a liquid crystal display panel PNL including a liquid crystal display driver DR.

The mobile device main body MM includes a processor CPU. Communication between the processor CPU and the touch panel controller 100A is carried out via SPI or I2C, and communication between the processor CPU and the liquid crystal display driver DR is carried out via an RGB interface or a CPU interface.

Thus, initial setting data such as a start, a sampling frequency or detection resolution is transmitted from the mobile device main body MM to the liquid crystal display module LDM. Detection data (X and Y coordinate data or presence/absence of finger touching) is transmitted from the liquid crystal display module LDM to the mobile device main body MM, and processed by the processor CPU of the mobile device main body MM based on position information detected by the touch panel 100 to be added to display information of the liquid crystal display panel.

Ninth Embodiment

Figure 15:
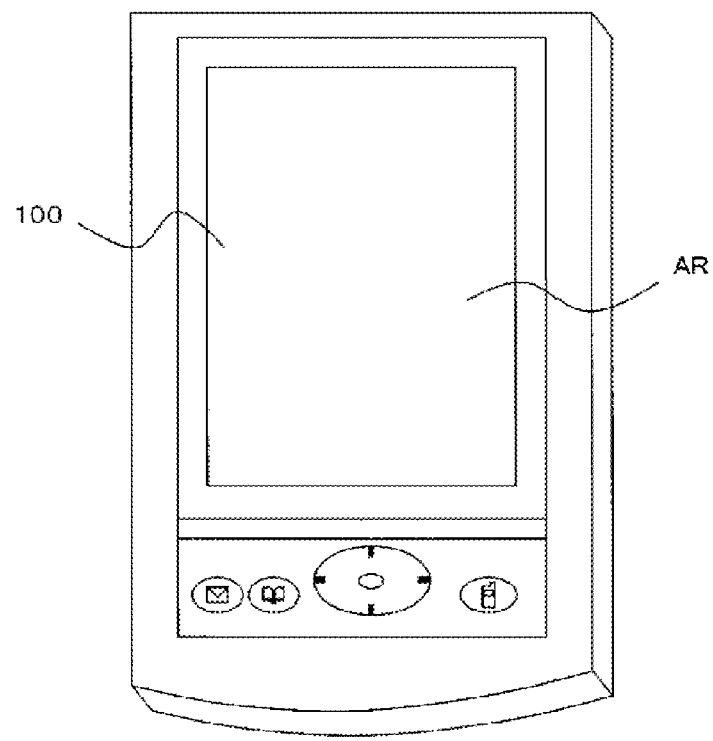
FIG. 15 illustrates an appearance of a mobile device to which the present invention is applied.

FIG. 15 illustrates, for example, an appearance of a mobile electronic device which includes the electrostatic capacitance type touch panel 100 of the present invention.

For example, the mobile electronic device includes a display area AR of a liquid crystal display device, and the electrostatic capacitance type touch panel 100 stacked on this display area AR. For example, an icon is displayed in the display area AR visible through the electrostatic capacitance type touch panel 100. By finger-touching a portion of the electrostatic capacitance type touch panel 100 on the icon, information can be reflected in the liquid crystal display device.

The embodiments described above have been directed to the liquid crystal display device as the exemplary display device. However, other display devices such as an organic EL display device may be used.

The present invention has been described by way of the embodiments. However, the configurations of the embodiments described above are only examples, and various changes can appropriately be made without departing from the technical ideas of the present invention. The configurations of the embodiments described above may be combined as long as they are not contradictory to one another.

While there have been described what are at present considered to be certain embodiments of the invention, it is understood that various modifications may be made thereto, and it is intended that the appended claims cover all such modifications as fall within the true spirit and scope of the invention.

What is claimed is:

1. An electrostatic capacitance type touch panel, comprising:
   a substrate;
   a plurality of first electrodes disposed in parallel on the substrate;
   an insulating film formed so as to cover the plurality of first electrodes;
   a plurality of second electrodes disposed in parallel to intersect the plurality of first electrodes on the insulating film;
   a plurality of first drawing wiring lines connected to the plurality of first electrodes to be drawn to a connection terminal; and
   a plurality of second drawing wiring lines connected to the plurality of second electrodes to be drawn to the connection terminal;
   wherein the plurality of first or second drawing wiring lines have different lengths;

wherein the plurality of first or second drawing wiring lines have different widths in accordance with a length thereof so that a width of a shortest length of the plurality of first or second drawing wiring lines is a widest width and a width of the longest length of the plurality of first or second drawing wiring lines is a narrowest width; and wherein the plurality of first or second drawing wiring lines have different intervals between adjacent two of the plurality of first or second drawing wiring lines as the lengths are longer so that the interval between the adjacent two of the plurality of first or second drawing wiring lines having the longest lengths is largest and the interval between the adjacent two of the plurality of first or second drawing wiring lines having the shortest lengths is smallest.

2. An electrostatic capacitance type touch panel according to claim 1, wherein each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

3. An electrostatic capacitance type touch panel according to claim 1, wherein:
the plurality of first electrodes comprise a transparent conductive layer;
the plurality of first drawing wiring lines are formed into a two-layer structure including a transparent conductive layer and a metal layer;
the plurality of second electrodes comprise a transparent conductive layer; and
the plurality of second drawing wiring lines are formed into a two-layer structure including a transparent conductive layer and a metal layer.

4. An electrostatic capacitance type touch panel, comprising:
a substrate;
a plurality of first electrodes disposed in parallel on the substrate;
an insulating film formed so as to cover the plurality of first electrodes;
a plurality of second electrodes disposed in parallel to intersect the plurality of first electrodes on the insulating film;
a plurality of first drawing wiring lines connected to the plurality of first electrodes to be drawn to a connection terminal; and
a plurality of second drawing wiring lines connected to the plurality of second electrodes to be drawn to the connection terminal, wherein:
the plurality of first drawing wiring lines have different lengths, the plurality of first drawing lines have larger widths as the lengths are shorter so that the first drawing wiring line having a shortest length has a widest width and the first drawing wiring line having a longest lengthy has a narrowest width, and the plurality of first drawing wiring lines have different intervals between adjacent two of the plurality of first drawing wiring lines as the lengths are longer so that the interval between the adjacent two first drawing wiring lines of the longest length is largest and the interval between the adjacent two first drawing wiring lines of the shortest lengths is narrowest; and
the plurality of second drawing wiring lines have different lengths, the plurality of second drawing lines have larger widths as the lengths are shorter so that the second drawing wiring line having a shortest length has a widest width and the second drawing wiring line having a longest length has a narrowest width, and the plurality of second drawing wiring lines have different intervals between adjacent two of the plurality of second drawing wiring lines as the lengths are longer so that the interval between the adjacent two second drawing wiring lines of the longest length is largest and the interval between the adjacent two second drawing wiring lines of the shortest lengths is narrowest.

5. An electrostatic capacitance type touch panel according to claim 4, wherein each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

6. An electrostatic capacitance type touch panel according to claim 4, wherein:
the plurality of first electrodes comprise a transparent conductive layer;
the plurality of first drawing wiring lines are formed into a two-layer structure including a transparent conductive layer and a metal layer;
the plurality of second electrodes comprise a transparent conductive layer; and
the plurality of second drawing wiring lines are formed into a two-layer structure including a transparent conductive layer and a metal layer.

7. A screen input display device, comprising:
a display device; and
an electrostatic capacitance type touch panel disposed on at least a display area of the display device, wherein:
the electrostatic capacitance type touch panel comprises:
a substrate;
a plurality of first electrodes disposed in parallel on the substrate;
an insulating film formed so as to cover the plurality of first electrodes;
a plurality of second electrodes disposed in parallel to intersect the plurality of first electrodes on the insulating film;
a plurality of first drawing wiring lines connected to the plurality of first electrodes to be drawn to a connection terminal; and
a plurality of second drawing wiring lines connected to the plurality of second electrodes to be drawn to the connection terminal, wherein
the plurality of first or second drawing wiring lines have different lengths, the plurality of first or second drawing wiring lines have different widths in accordance with a length thereof so that a width of a shortest length of the plurality of first or second drawing wiring lines is the widest width and a width of a longest length of the first or second drawing wiring lines is the narrowest width, and the plurality of first and second drawing wiring lines have different intervals between adjacent two of the plurality of first or second drawing wiring lines as the lengths are longer so that the interval between the adjacent two of the plurality of first or second drawing wiring lines having the longest lengths is largest and the interval between the adjacent two of the plurality of first or second drawing wiring lines having the shortest lengths is smallest.

8. A screen input display device according to claim 7, wherein each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

9. A screen input display device according to claim 7, wherein:
the plurality of first electrodes comprise a transparent conductive layer;
the plurality of first drawing wiring lines are formed into a two-layer structure including a transparent conductive layer and a metal layer;
the plurality of second electrodes comprise a transparent conductive layer; and
the plurality of second drawing wiring lines are formed into a two-layer structure including a transparent conductive layer and a metal layer.

10. A screen input display device, comprising:
a display device; and
an electrostatic capacitance type touch panel disposed in at least a display area of the display device, wherein:
the electrostatic capacitance type touch panel comprises:
a substrate;
a plurality of first electrodes disposed in parallel on the substrate;
an insulating film formed so as to cover the plurality of first electrodes;
a plurality of second electrodes disposed in parallel to intersect the plurality of first electrodes on the insulating film;
a plurality of first drawing wiring lines connected to the plurality of first electrodes to be drawn to a connection terminal; and
a plurality of second drawing wiring lines connected to the plurality of second electrodes to be drawn to the connection terminal, wherein
the plurality of first drawing wiring lines have different lengths, the plurality of first drawing lines have larger widths as the lengths are shorter so that the first drawing wiring line having a shortest length has a widest width and the first drawing wiring line having a longest length has a narrowest width, and the plurality of first drawing wiring lines have different intervals between adjacent two of the plurality of first drawing wiring lines as the lengths are longer so that the interval between the adjacent two first drawing wiring lines of the longest length is largest and the interval between the adjacent two first drawing wiring lines of the shortest lengths is narrowest; and
the plurality of second drawing wiring lines have different lengths, the plurality of second drawing lines have larger widths as the lengths are shorter so that the second drawing wiring line having a shortest length has a widest width and the second drawing wiring line having a longest length has a narrowest width, and the plurality of second drawing wiring lines have different intervals between adjacent two of the plurality of second drawing wiring lines as the lengths are longer so that the interval between the adjacent two second drawing wiring lines of the longest length is largest and the interval between the adjacent two second drawing wiring lines of the shortest lengths is narrowest.

11. A screen input display device according to claim 10, wherein each of the plurality of first electrodes and the plurality of second electrodes is formed so that pad portions and thin line portions thinner than the pad portions are alternately arrayed in an extending direction of the each of the plurality of first electrodes and the plurality of second electrodes, and in plan view, the pad portions of the plurality of first electrodes and the pad portions of the plurality of second electrodes are arranged so as not to overlap each other.

12. A screen input display device according to claim 10, wherein:
the plurality of first electrodes comprise a transparent conductive layer;
the plurality of first drawing wiring lines are formed into a two-layer structure including a transparent conductive layer and a metal layer;
the plurality of second electrodes comprise a transparent conductive layer; and
the plurality of second drawing wiring lines are formed into a two-layer structure including a transparent conductive layer and a metal layer.

13. An electrostatic capacitance type touch panel according to claim 1, wherein the plurality of first or second drawing lines include at least three first or second drawing lines extending with different lengths from one another from an end of one of a column and row of the first and second electrodes to the connection terminal, adjacent ones of the first or second drawing lines having different lengths which increase in length from one another in one of a first and second direction with respect to the connector and having widths different from one another which decrease in width from one another in the one of the first and second direction, and intervals between each adjacent two of the at least three of the first or second drawing lines which increase from one another in the one of the first and second direction in which the lengths of the adjacent ones of the first and second drawing lines increase in length from the other.

14. An electrostatic capacitance type touch panel according to claim 4, wherein the plurality of first drawing lines include at least three first drawing lines extending with different lengths from one another from an end of one of a column and row of the first electrodes to the connection terminal, adjacent ones of the first drawing lines having different lengths which increase in length from one another in a first direction with respect to the connection terminal and having widths different from one another which decrease in width from one another in the first direction, and intervals between adjacent two of the at least three of the first drawing lines which increase from one another in the first direction in which the lengths of the adjacent ones of the first drawing lines increase in length from one another, and wherein the plurality of second drawing lines include at least three second drawing lines extending with different lengths from one another from an end of another of the column and row of the second electrodes to the connection terminal, adjacent ones of the second drawing lines having different lengths which increase in length from one another in a second direction opposite to the first direction with respect to the connection terminal and having widths different from one another which decrease in width from one another in the second direction, and intervals between each adjacent two of the at least three of the second drawing lines which increase from one another in the second direction in which the lengths of the adjacent ones of the second drawing lines increase in length from one another.

15. A screen input display device according to claim 7, wherein the plurality of first or second drawing lines include at least three first or second drawing lines extending with different lengths from one another from an end of one of a column and row of the first and second electrodes to the connection terminal, adjacent ones of the first or second drawing lines having different lengths which increase in length from one another in one of a first and second direction with respect to the connector and having widths different from one another which decrease in width from one another in the one of the first and second direction, and intervals between each adjacent two of the at least three of the first or second drawing lines which increase from one another in the one of the first and second direction in which the lengths of the adjacent ones of the first and second drawing lines increase in length from the other.

16. A screen input display device according to claim 10, wherein the plurality of first drawing lines include at least three first drawing lines extending with different lengths from one another from an end of one of a column and row of the first electrodes to the connection terminal, adjacent ones of the first drawing lines having different lengths which increase in length from one another in a first direction with respect to the connection terminal and having widths different from one another which decrease in width from one another in the first direction, and intervals between adjacent two of the at least three of the first drawing lines which increase from one another in the first direction in which the lengths of the adjacent ones of the first drawing lines increase in length from one another, and wherein the plurality of second drawing lines include at least three second drawing lines extending with different lengths from one another from an end of another of the column and row of the second electrodes to the connection terminal, adjacent ones of the second drawing lines having different lengths which increase in length from one another in a second direction opposite to the first direction with respect to the connection terminal and having widths different from one another which decrease in width from one another in the second direction, and intervals between each adjacent two of the at least three of the second drawing lines which increase from one another in the second direction in which the lengths of the adjacent ones of the second drawing lines increase in length from one another.

17. An electrostatic capacitance type touch panel according to claim 1, wherein each of the first and second drawing wiring lines is a continuous conductive non-segmented drawing wiring line having a different length and a different width with respect to an adjacent drawing wiring line, and different intervals with respect to adjacent drawing wiring lines sufficient to enable diminishing of a capacitance difference among the plurality of first and second drawing wiring lines and to enable improvement of detection accuracy for the electrostatic capacitance type touch panel.

18. An electrostatic capacitance type touch panel according to claim 4, wherein each of the first and second drawing wiring lines is a continuous conductive non-segmented drawing wiring line having a different length and a different width with respect to an adjacent drawing wiring line, and different intervals with respect to adjacent drawing wiring lines sufficient to enable diminishing of a capacitance difference among the plurality of first and second drawing wiring lines and to enable improvement of detection accuracy for the electrostatic capacitance type touch panel.

19. A screen input display device according to claim 7, wherein each of the first and second drawing wiring lines is a continuous conductive non-segmented drawing wiring line having a different length and a different width with respect to an adjacent drawing wiring line, and different intervals with respect to adjacent drawing wiring lines sufficient to enable diminishing of a capacitance difference among the plurality of first and second drawing wiring lines and to enable improvement of detection accuracy for the electrostatic capacitance type touch panel.

20. A screen input display device according to claim 10, wherein each of the first and second drawing wiring lines is a continuous conductive non-segmented drawing wiring line having a length and width with respect to an adjacent drawing wiring line and an interval therebetween so as to diminish a capacitance difference among the plurality of first and second drawing wiring lines and improve detection accuracy for the electrostatic capacitance type touch panel.

* * * * *